US012603380B2

(12) United States Patent
Gupte et al.

(10) Patent No.: US 12,603,380 B2
(45) Date of Patent: Apr. 14, 2026

(54) BATTERY PACK INCLUDING HINGED FLAP FOR RELEASE OF VENT GAS

(71) Applicant: Ford Global Technologies, LLC, Dearborn, MI (US)

(72) Inventors: Parikshit Gupte, West Bloomfield, MI (US); Giriraj Srinivasan, Troy, MI (US); Bhaskara Rao Boddakayala, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 612 days.

(21) Appl. No.: 18/104,455

(22) Filed: Feb. 1, 2023

(65) Prior Publication Data

US 2024/0258639 A1     Aug. 1, 2024

(51) Int. Cl.
H01M 50/325        (2021.01)
H01M 50/367        (2021.01)

(52) U.S. Cl.
CPC ....... H01M 50/325 (2021.01); H01M 50/367 (2021.01); *H01M 2220/20* (2013.01)

(58) Field of Classification Search
CPC ............. H01M 50/325; H01M 50/367; H01M 2220/20; H01M 50/209; H01M 50/249; H01M 50/244; H01M 50/30; Y02E 60/10; B60L 50/61
See application file for complete search history.

(56) References Cited

U.S. PATENT DOCUMENTS 9,614,208 B2    4/2017   Lee
9,685,645 B2    6/2017   Janarthanam et al.

9,825,345 B2    11/2017  Liu et al.
10,312,490 B2   6/2019   Maguire
10,707,464 B2   7/2020   Freiman et al.
2012/0164490 A1  6/2012   Itoi et al.

(Continued)

FOREIGN PATENT DOCUMENTS

JP      2016062757 A    4/2016
WO      2020194965 A1   10/2020

OTHER PUBLICATIONS

Toor, Stuart (2005). Innovative multiphase extraction design operating above the upper flammability limit (UFL). KOMEX.

(Continued)

*Primary Examiner* — Daniel S Gatewood

(74) *Attorney, Agent, or Firm* — David B. Kelley; Carlson, Gaskey & Olds, P.C.

(57)                ABSTRACT

This disclosure relates to a battery assembly of an electrified vehicle, and in particular to a battery pack with a hinged flap configured to release vent gas. In some aspects, the techniques described herein relate to a battery assembly for an electrified vehicle, including: a battery array including a plurality of battery cells; an enclosure assembly surrounding the battery array; and a frame within the enclosure assembly, wherein the frame includes a flap, wherein the flap includes a perimeter having a first portion along which a first gap is present between the flap and the frame throughout an entirety of a thickness of the frame, and a second portion configured as a hinge of the flap and along which a second gap is present only partially through the thickness, wherein the second gap is formed in a side of the frame facing the plurality of battery cells.

21 Claims, 4 Drawing Sheets

(56) References Cited

U.S. PATENT DOCUMENTS

| | | | |
|---|---|---|---|
| 2013/0095356 A1* | 4/2013 | Shimizu | H01M 50/519 |
| | | | 429/88 |
| 2020/0256921 A1 | 8/2020 | Hwang et al. | |
| 2022/0223972 A1 | 7/2022 | Zhu et al. | |

OTHER PUBLICATIONS

Britton et al. (Sep. 21, 2012). CDC—mining—the role of ASTM E27 methods in Hazard assessment: Part II—!!—NIOSH. Centers for Disease Control and Prevention. Retrieved Jan. 24, 2023, from https://www.cdc.gov/niosh/mining/works/coversheet1755.html.
Gas cylinders—Gases and gas mixtures—Determination of fire potential and oxidizing ability for the selection of cylinder valve outlets. Scc.isolutions.iso.org. (n.d.). Retrieved Jan. 24, 2023, from https://scc.isolutions.iso.org/obp/ui#!iso:std:iso:10156:ed-4:v1:en.
Edwards. "Vacuum pump and vacuum systems—safety manual". 2008.

* cited by examiner

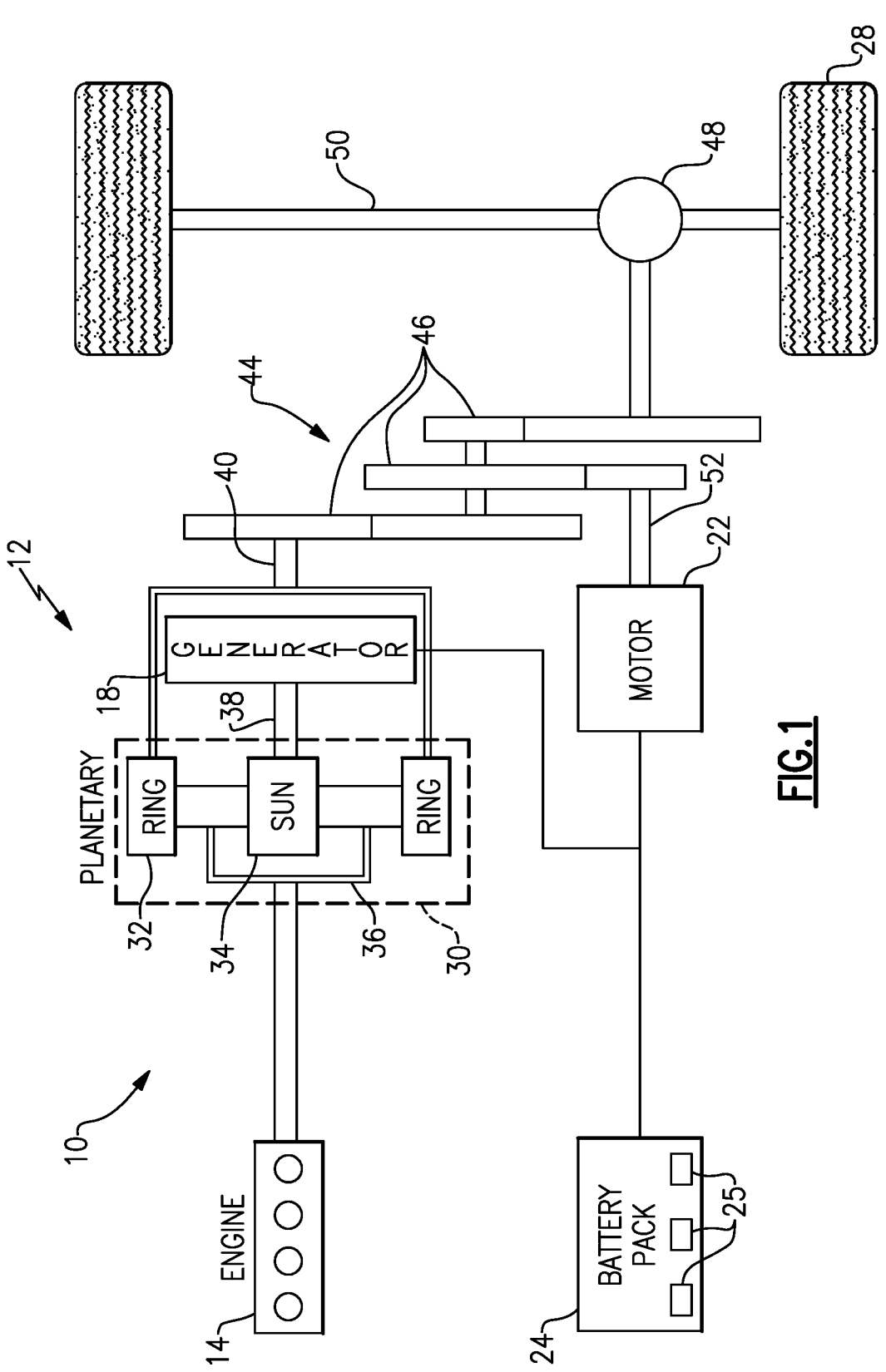
_FIG.1_

BATTERY PACK INCLUDING HINGED FLAP FOR RELEASE OF VENT GAS

TECHNICAL FIELD

This disclosure relates to a battery assembly of an electrified vehicle, and in particular to a battery pack with a hinged flap configured to release vent gas.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

A high voltage battery pack typically powers the electric machines and other electrical loads of the electrified vehicle. The battery pack includes a plurality of battery cells and various other battery internal components that support electric propulsion of electrified vehicles.

SUMMARY

In some aspects, the techniques described herein relate to a battery assembly for an electrified vehicle, including: a battery array including a plurality of battery cells; an enclosure assembly surrounding the battery array; and a frame within the enclosure assembly, wherein the frame includes a flap, wherein the flap includes a perimeter having a first portion along which a first gap is present between the flap and the frame throughout an entirety of a thickness of the frame, and a second portion configured as a hinge of the flap and along which a second gap is present only partially through the thickness, wherein the second gap is formed in a side of the frame facing the plurality of battery cells.

In some aspects, the techniques described herein relate to a battery assembly, wherein: the flap is moveable between a resting position and a vent gas release position by rotating about the hinge, and in the vent gas release position, the flap rotated in a direction away from the plurality of battery cells to form a vent gas opening in which vent gas can flow through the frame via the vent gas opening.

In some aspects, the techniques described herein relate to a battery assembly, wherein: in the resting position, the flap is substantially co-planar with a remainder of the frame, and in the vent gas release position, the flap is inclined at an angle non-parallel to a plane containing the remainder of the frame.

In some aspects, the techniques described herein relate to a battery assembly, wherein: in the resting position, the flap is configured to resist vent gas flowing through the flap in a direction toward the plurality of battery cells.

In some aspects, the techniques described herein relate to a battery assembly, wherein the flap is integrally formed with a remainder of the frame.

In some aspects, the techniques described herein relate to a battery assembly, wherein the perimeter includes four sides arranged substantially perpendicular to one another.

In some aspects, the techniques described herein relate to a battery assembly, wherein the first portion extends along a first side, a second side, and a third side of the four sides, and the second portion extends along a fourth side of the four sides.

In some aspects, the techniques described herein relate to a battery assembly, wherein: the frame includes a first surface and a second surface, the thickness is a dimension between the first surface and the second surface, the second surface faces the plurality of battery cells, and the second gap extends from the second surface toward the first surface by a height at least half the thickness but not equal to the thickness.

In some aspects, the techniques described herein relate to a battery assembly, wherein the height is between 70-80 percent of the thickness.

In some aspects, the techniques described herein relate to a battery assembly, wherein: the flap is a first flap, the first flap is arranged vertically above a first group of the plurality of battery cells, the frame includes a second flap spaced-apart from the first flap, the second flap is arranged vertically above a second group of the plurality of battery cells, the battery assembly further includes a thermal barrier and a particle barrier, the thermal barrier is arranged between the first and second groups of the plurality of battery cells, the particle barrier is between the plurality of battery cells and the frame, and the thermal barrier extends from a base of the enclosure assembly to the particle barrier.

In some aspects, the techniques described herein relate to a battery assembly, wherein the frame is between a top of the enclosure assembly and the particle barrier.

In some aspects, the techniques described herein relate to a battery assembly, wherein the frame is made of a composite material.

In some aspects, the techniques described herein relate to a battery assembly, wherein the flap is machined-into the frame.

In some aspects, the techniques described herein relate to a battery assembly, wherein the flap is molded-into or cast-into the frame.

In some aspects, the techniques described herein relate to a method, including: forming a flap in a frame of a battery assembly of a motor vehicle, wherein the flap includes a perimeter having a first portion along which a first gap is present between the flap and the frame throughout an entirety of a thickness of the frame, and a second portion configured as a hinge of the flap and along which a second gap is present only partially through the thickness, wherein the second gap is formed in a side of the frame configured to face a plurality of battery cells.

In some aspects, the techniques described herein relate to a method, further including: rotating the flap about the hinge between a resting position and a vent gas release position.

In some aspects, the techniques described herein relate to a method, further including: when the flap is in the vent gas release position, permitting vent gas to flow through a vent gas opening in a first direction.

In some aspects, the techniques described herein relate to a method, further including: when the flap is in the resting position, resisting vent gas flowing through the vent gas opening in a second direction opposite the first direction.

In some aspects, the techniques described herein relate to a method, wherein: when the flap is in the resting position, the flap is substantially co-planar with a remainder of the frame, and when the flap is in the vent gas release position, the flap is inclined at an angle non-parallel to a plane containing the remainder of the frame.

In some aspects, the techniques described herein relate to a method, wherein: the frame includes a first surface and a second surface, the thickness is a dimension between the first surface and the second surface, and the second gap extends from the second surface toward the first surface by a height at least half the thickness but not equal to the thickness.

BRIEF DESCRIPTION OF THE DRAWINGS

FIG. 1 schematically illustrates an example powertrain of an electrified vehicle.

DETAILED DESCRIPTION

Figure 2:
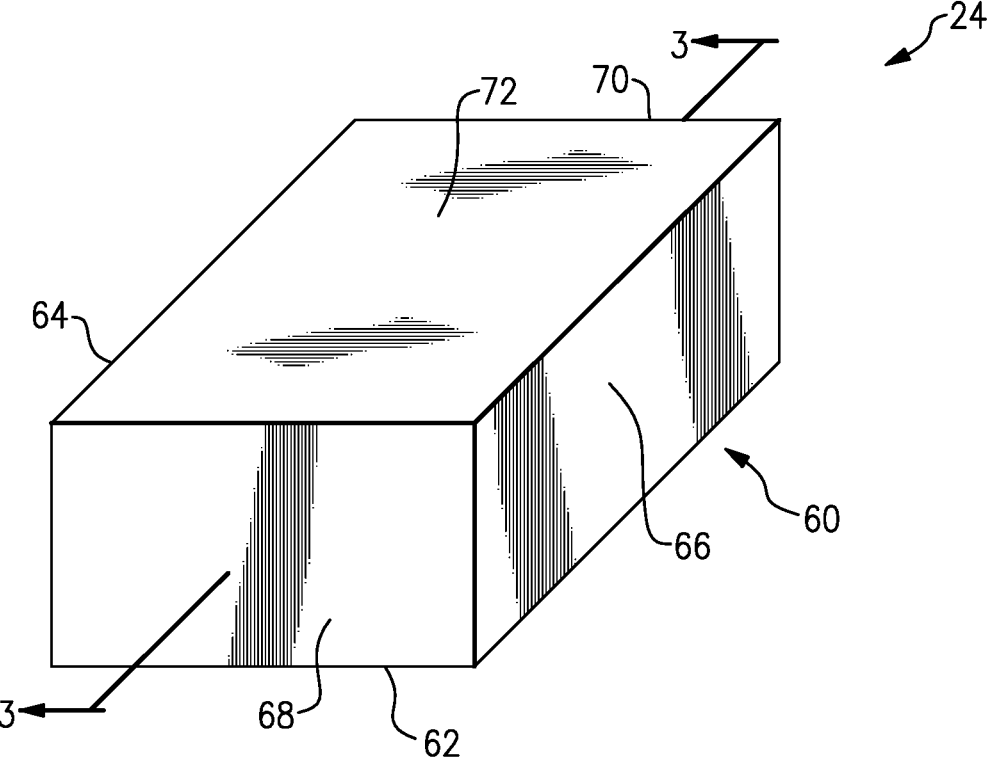
FIG. 2 is a perspective, assembled view of the example battery assembly.

This disclosure relates to a battery assembly of an electrified vehicle, and in particular to a battery pack with a hinged flap configured to release vent gas. Among other benefits, which will be appreciated from the below description, the disclosed arrangement mitigates thermal events.

FIG. 1 schematically illustrates a powertrain 10 for an electrified vehicle 12 ("vehicle 12"). Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery arrays 25, or other groupings of battery cells, capable of outputting electrical power to operate the motor 22, the generator 18, and/or other electrical loads of the vehicle 12.

An example battery array 25 includes a single battery array with a plurality of battery cells. This disclosure is not limited to battery packs with one battery array and extends to battery packs with one or more battery arrays. Other types of energy storage devices and/or output devices can also be used to electrically power the vehicle 12.

In one non-limiting embodiment, the vehicle 12 has two basic operating modes. The vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The vehicle 12 may additionally operate in a Hybrid (HEV) mode in which the engine 14 and the motor 22 are both used for vehicle propulsion. The HEV mode is an example of a charge sustaining mode of operation for the vehicle 12. During the HEV mode, the vehicle 12 may reduce the motor 22 propulsion usage in order to maintain the state of charge of the battery assembly 24 at a constant or approximately constant level by increasing the engine 14 propulsion usage. The vehicle 12 may be operated in other operating modes in addition to the EV and HEV modes within the scope of this disclosure.

Figure 3:
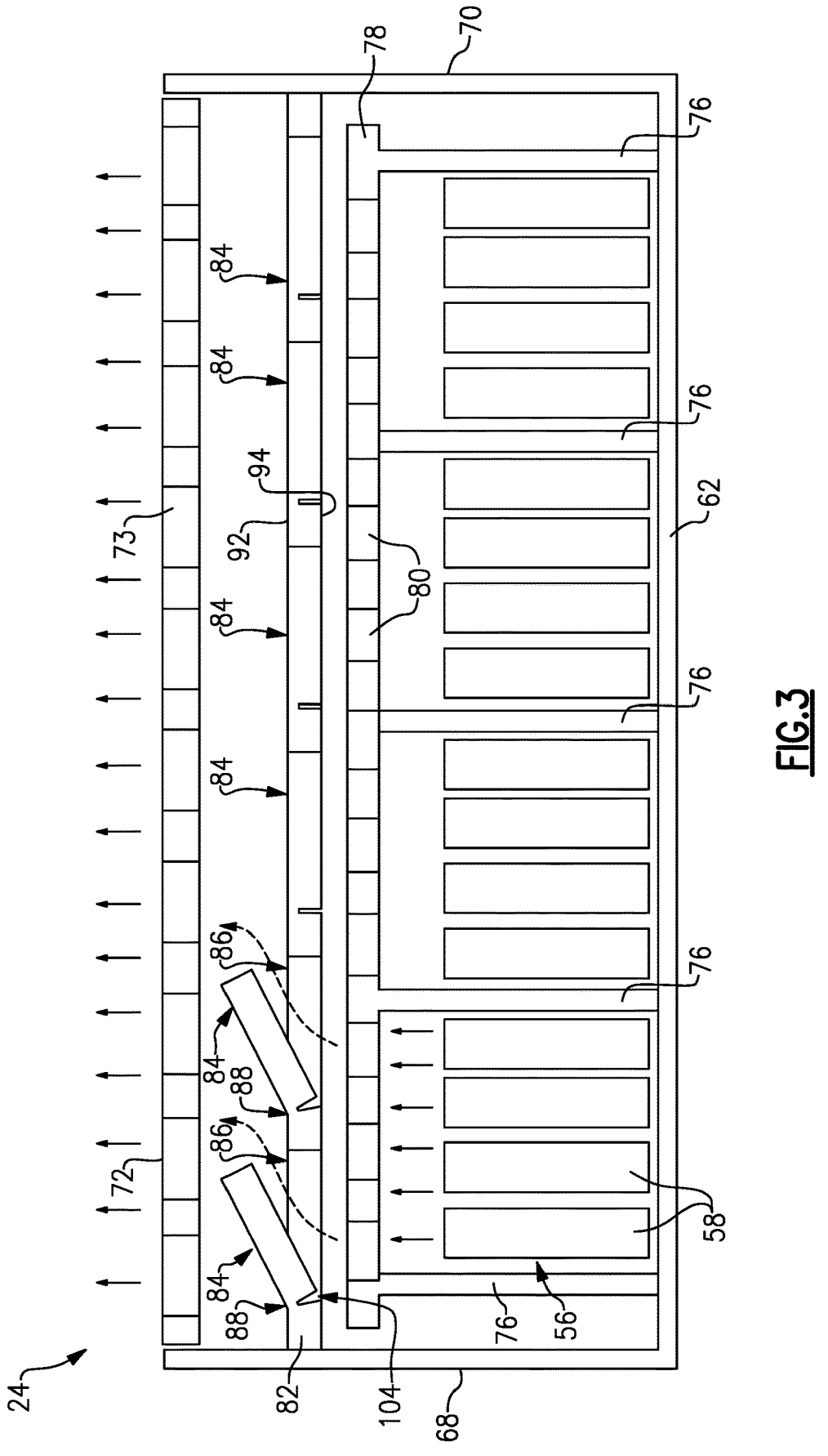
FIG. 3 is a cross-sectional view of an interior of the battery assembly taken along line 3-3 from FIG. 2.

FIG. 2 illustrates additional detail of the battery assembly 24 in an assembled state. FIG. 3 is a cross-sectional view illustrating an interior of the battery assembly 24. With joint reference to FIGS. 2 and 3, the battery assembly 24 includes one battery array, labeled as 56 in FIG. 3 and representative of one or more of the battery arrays 25 from FIG. 1, configured to supply electrical power to various vehicle components. While one battery array 56 is shown in FIG. 3, the battery assembly 24 could include additional battery arrays, as represented by FIG. 1.

The battery array 56 includes a plurality of battery cells 58. Although not shown in the schematic depiction of FIG.

2, the battery cells 58 may be electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 (FIG. 2) surrounds the battery array 56. The enclosure assembly 60 includes a bottom wall 62, left and right side walls 64, 66, end walls 68, 70, and a top wall 72. The top wall 72 may include, in this example, slots or channels 73 (FIG. 3), which are shown schematically and configured to direct particles, including particles suspended in fluid, away from the battery cells 58. The enclosure assembly 60 surrounds an interior 74 (i.e., area inside the walls 62, 64, 66, 68, 70, 72) of the enclosure assembly 60, which houses the battery array 56 and other components of the battery assembly 24. The enclosure assembly 60 may take any size, shape or configuration, and is not limited to the specific configuration of FIGS. 2 and 3.

The adjacent parts of the enclosure assembly 60 are connected together. In order to provide an air and water-tight seal, one or more gaskets and/or seals may fill the space at an interface between the mating surfaces of the parts of the enclosure assembly 60.

During operation of the electrified vehicle 12, the battery cells 58 and internal components of the battery assembly 24 can experience certain battery thermal events. Further, during such events, the battery cells 58 may vent gases into the interior 74 of the enclosure assembly 60. The vent gases may be caused by an applied force or a thermal event, and can either cause or exacerbate an existing thermal event. The vent gases expelled by the battery cells 58 may include a gaseous byproduct including gas and debris, such as relatively small, solid particles and/or liquid droplets suspended in the gas. In this disclosure, reference to "gas" or "vent gas" is inclusive of any debris, particles, and/or droplets suspended in that gas, unless specifically indicated.

In FIG. 2, some adjacent battery cells 58 directly contact one another. This disclosure extends to other arrangements, such as in FIG. 3, in which there is a separator, or thermal barrier, 76 which is a wall-like structure, or divider, extending vertically between some groups of adjacent battery cells 58. The quantities of battery cells 58 and separators 76 in FIG. 3 are exemplary.

In this example, the separators 76 extend from the bottom wall 62 to a particle barrier 78, which is a wall-like structure arranged vertically above the battery cells 58 and extending substantially perpendicular to the separators 76. The particle barrier 78 also includes, in this example, slots or channels 80, which are shown schematically and configured to direct particles, including particles suspended in fluid, away from the battery cells 58. The particle barrier 78 is not present in all examples. When present, the slots or channels 80 are optional.

Vertically above the particle barrier 78 (if present), a frame 82 is within the enclosure assembly 60. The frame 82 is vertically between the battery cells 58 and the top wall 72. The frame 82 is a substantially flat plate parallel to the top wall 72, in this example. The edges of the frame 82 directly contact, and are attached to, the walls 64, 66, 68, 70.

The frame 82 is made of a material with a relatively low thermal conductivity, a relatively low breakdown voltage, a relatively high flexural modulus, and a relatively high tensile strength. In a particular example, the frame 82 may be made of a material that exhibits a thermal conductivity less than 0.3 W/m*K (Watts per meter-Kelvin), a breakdown voltage less than 20 kV, a flexural modulus of 120 MPa, and a tensile strength of 1800 MPa. Example materials for the frame 82 include mica and fiber glass. The materials of frame 82 may also be both electrically and thermally insulated. The material of the frame 82 may be a composite material. The separators 76 and particle barrier 78, if present, may be made of the same material as the frame 82.

The frame 82 includes at least one flap configured to selectively open to establish a vent gas opening through the frame 82. In the example of FIG. 3, the frame 82 includes at least six flaps 84 spaced-apart from one another and each of which is able to hinge relative to a corresponding vent gas opening 86 to provide a passageway for vent gas to flow through the frame 82.

The flaps 84 are moveable between a resting position and a vent gas release position by rotating about the hinge 88. In FIG. 3, two flaps 84 have moved relative to hinge 88 to the vent gas release position in which vent gas is able to flow relative to a vent gas opening 86 corresponding to those flaps 84. In particular, the two flaps 84 have rotated in a direction away from the battery cells 58, which is counterclockwise relative to FIG. 3, about a respective hinge 88 to a position in which the two flaps 84 are non-parallel to the remainder of the frame 82, and in particular are inclined at an acute angle relative to the remainder of the frame 82.

Four flaps 84 are in a resting position in which those flaps 84 lie in a plane substantially co-planar with a plane containing the frame 82, and specifically a plane containing the portions of the frame 82 that do not include flaps 84. In the resting position, the flaps 84 resist flow of vent gases through the frame 82 in a direction toward the battery cells 58, which resists flow of vent gases to battery cells 58 that are not experiencing a thermal event, and in turn mitigates the thermal event.

Figures 4, 5:
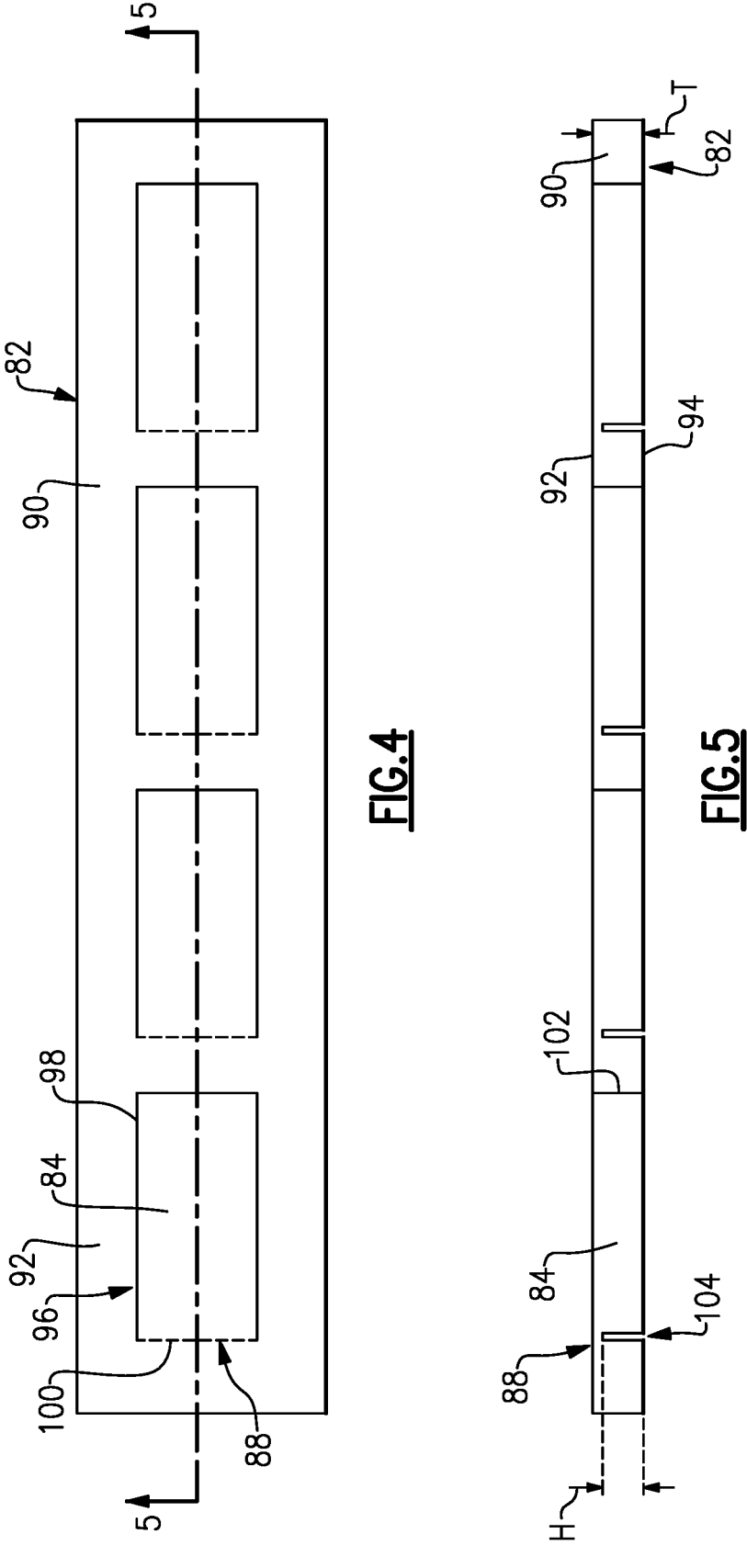
FIG. 4 is a top view of an example frame.
FIG. 5 is a cross-sectional view of the example frame taken along line 5-5 from FIG. 4.

Additional detail of the frame 82 will now be described with reference to FIGS. 4 and 5. In FIGS. 4 and 5, four flaps 84 are shown. One of the flaps 84 will be described in detail. It should be understood that each of the flaps 84 is configured in substantially the same manner as the one flap that is described.

The frame 82 is formed as a substantially flat plate including a main body 90 exhibiting a dimension, specifically thickness T, between a first surface 92 and a second surface 94. With reference to FIG. 3, the first surface 92 is a top surface, and faces away from the battery cells 58. The second surface 94 is a bottom surface and faces toward the battery cells 58.

With reference back to FIGS. 4 and 5, the flap 84 includes a perimeter 96 having a first portion 98, which is represented as a solid line in FIG. 4, and a second portion 100, which is represented as a dashed line in FIG. 4. In this example, the perimeter 96 is substantially rectangular when viewed from above, and includes four sides arranged substantially perpendicular to one another. The first portion 98 extends along a first, second, and third sides of the rectangular perimeter, and the second portion 100 extends along the fourth side of the rectangular perimeter. Together, the first and second portions 98, 100 provide the entire perimeter 96. This disclosure extends to flaps with differently-shaped perimeters.

Along the first portion 98, a first gap 102 exists between the flap 84 and the main body 90 (FIG. 5). The first gap 102 is present, and extends, throughout the entirety of the thickness T of the frame 82 along the entire first portion 98. The first gap 102 is any space, including a relatively small space, between the flap 84 and the main body 90 that permits movement between the flap 84 and the main body 90.

Along the second portion 100, a second gap 104 (FIG. 5) exists between the flap 84 and the main body 90. The second gap 104 is present only partially through the thickness T. The second gap 104 is on a same side of the frame 82 as the plurality of battery cells 58 (FIG. 3). In this example, the second gap 104 extends from the second surface 94 toward the first surface 92 by a height H. In this example, the height H is greater than half the thickness T, but not equal to the thickness T, such that the second gap 104 does not extend through the entirety of the thickness T of the frame 82. In a further example, the height H is between 70-80 percent of the thickness T.

The second gap 104 effectively forms the area above the second gap 104 into the hinge 88. Specifically, the hinge 88 is provided above the second gap 104 along the second portion 100. The second gap 104 may be configured as a notch having angled walls, such that the width of the second gap 104 tapers moving toward the first surface 92. Alternatively, the second gap 104 may include a rectangular cross-section, including walls substantially perpendicular to an immediately adjacent one of the walls, such that a width of the second gap 104 is substantially constant moving toward the first surface 92.

The flap 84 is machined-into the frame 82, in one example, by machining the first and second gaps 102, 104 into the main body 90 of the frame 82, such as by using a laser cutting process as one example. In another example, the flap 84 is molded-into or cast-into the frame 82, using a mold, for example, that forms the first and second gaps 102, 104. Alternatively, the frame 82 could be additively manufactured such that the frame includes the flap 84. This disclosure is not limited to any particular manufacturing technique, however.

The flap 84 is integrally formed with a remainder of the frame 82, in this example. Specifically, the same material that forms the main body 90 also provides the flap 84. Further, there are no seams, cracks, or gaps on the first surface 92 along the second portion 100. The flap 84 is relatively easily manufactured and reduces the number of component parts, such as by using existing structures of the battery assembly 24, namely the frame 82.

The battery cells 58 are configured to release vent gases from the interior of the battery cells 58 when the battery cells 58 become relatively hot and/or experience an increase in pressure, such as during a thermal event. Such a thermal event is represented relative to a group of four battery cells 58 on the left-hand side of FIG. 3. The vent gases released from those battery cells 58 exhibit a relatively high pressure and flow through the particle barrier 78 toward the frame 82. When the vent gases reach the frame 82, the two flaps 84 adjacent the group of the four battery cells 58 are urged, under the pressure of the vent gases, to the vent gas release position shown in FIG. 3.

The configuration of the flaps 84, including the second gap 104 facing the battery cells 58, increases the ease with which the vent gases can urge the flaps 84 to the vent gas release position. Further, because the second gap 104 is not present on the first surface 92, the disclosed configuration resists a flow of vent gas through the frame 82 in a direction toward the battery cells 58.

It should be understood that terms such as "about," "substantially," and "generally" are not intended to be boundaryless terms, and should be interpreted consistent with the way one skilled in the art would interpret those terms. It should also be understood that directional terms such as "upper," "top," "vertical," "forward," "rear," "side," "above," "below," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly for an electrified vehicle, comprising:
   a battery array including a plurality of battery cells;
   an enclosure assembly surrounding the battery array; and
   a frame within the enclosure assembly, wherein the frame includes a flap, wherein the flap includes a perimeter having a first portion along which a first gap is present between the flap and the frame throughout an entirety of a thickness of the frame, and a second portion configured as a hinge of the flap and along which a second gap is present only partially through the thickness, wherein the second gap is formed in a side of the frame facing the plurality of battery cells.

2. The battery assembly as recited in claim 1, wherein:
   the flap is moveable between a resting position and a vent gas release position by rotating about the hinge, and
   in the vent gas release position, the flap has rotated in a direction away from the plurality of battery cells to form a vent gas opening in which vent gas can flow through the frame via the vent gas opening.

3. The battery assembly as recited in claim 2, wherein:
   in the resting position, the flap is substantially co-planar with a remainder of the frame, and
   in the vent gas release position, the flap is inclined at an angle non-parallel to a plane containing the remainder of the frame.

4. The battery assembly as recited in claim 2, wherein:
   in the resting position, the flap is configured to resist vent gas flowing through the flap in a direction toward the plurality of battery cells.

5. The battery assembly as recited in claim 1, wherein the flap is integrally formed with a remainder of the frame.

6. The battery assembly as recited in claim 1, wherein the perimeter includes four sides arranged substantially perpendicular to one another.

7. The battery assembly as recited in claim 6, wherein the first portion extends along a first side, a second side, and a third side of the four sides, and the second portion extends along a fourth side of the four sides.

8. The battery assembly as recited in claim 1, wherein:
   the frame includes a first surface and a second surface,
   the thickness is a dimension between the first surface and the second surface,
   the second surface faces the plurality of battery cells, and
   the second gap extends from the second surface toward the first surface by a height at least half the thickness but not equal to the thickness.

9. The battery assembly as recited in claim 8, wherein the height is between 70-80 percent of the thickness.

10. A battery assembly, comprising;

a battery array including a plurality of battery cells;

an enclosure assembly surrounding the battery array; and a frame within the enclosure assembly, wherein the frame includes a flap, wherein the flap includes a perimeter having a first portion along which a first gap is present between the flap and the frame throughout an entirety of a thickness of the frame, and a second portion configured as a hinge of the flap and along which a second gap is present only partially through the thickness, wherein the second gap is formed in a side of the frame facing the plurality of battery cells, wherein the flap is a first flap, wherein the first flap is arranged vertically above a first group of the plurality of battery cells, wherein the frame includes a second flap spaced-apart from the first flap, wherein the second flap is arranged vertically above a second group of the plurality of battery cells, wherein the battery assembly further comprises a thermal barrier and a particle barrier, wherein the thermal barrier is arranged between the first and second groups of the plurality of battery cells, wherein the particle barrier is between the plurality of battery cells and the frame, and wherein the thermal barrier extends from a base of the enclosure assembly to the particle barrier.

11. The battery assembly as recited in claim 10, wherein the frame is between a top of the enclosure assembly and the particle barrier.

12. The battery assembly as recited in claim 1, wherein the frame is made of a composite material.

13. The battery assembly as recited in claim 1, wherein the flap is machined-into the frame.

14. The battery assembly as recited in claim 1, wherein the flap is molded-into or cast-into the frame.

15. The battery assembly as recited in claim 8, wherein the second gap is defined by three walls arranged such that the second gap exhibits a rectangular cross-section.

16. The battery assembly as recited in claim 15, wherein each of the three walls is substantially perpendicular to an immediately adjacent one of the three walls.

17. The battery assembly as recited in claim 8, wherein a width of the second gap, measured in a direction perpendicular to a length of the second portion, is substantially constant moving toward the first surface.

18. The battery assembly as recited in claim 8, wherein there are no seams, cracks, or gaps on the first surface in a location vertically above the second portion.

19. The battery assembly as recited in claim 18, wherein the height is between 70-80 percent of the thickness.

20. A battery assembly for an electrified vehicle, comprising:

a battery array including a plurality of battery cells;

an enclosure assembly surrounding the battery array; and a frame within the enclosure assembly, wherein the frame includes a flap, wherein the flap includes a perimeter having a first portion along which a first gap is present between the flap and the frame throughout an entirety of a thickness of the frame, and a second portion configured as a hinge of the flap and along which a second gap is present only partially through the thickness, wherein a height of the second gap is between 70-80 percent of the thickness, and wherein a surface of the frame vertically above the second gap is free of seams, cracks, or gaps.

21. The battery assembly as recited in claim 20, wherein a width of the second gap, measured in a direction perpendicular to a length of the second portion, is substantially constant moving toward the surface of the frame vertically above the second gap.

* * * * *